US008721414B1

(12) United States Patent
Alhazza

(10) Patent No.: US 8,721,414 B1
(45) Date of Patent: May 13, 2014

(54) CARD GAME AND METHOD FOR PLAYING A CARD GAME

(71) Applicant: Hebah Abdullah Alhazza, Qortuba (KW)

(72) Inventor: Hebah Abdullah Alhazza, Qortuba (KW)

( * ) Notice: Subject to any disclaimer, the term of this patent is extended or adjusted under 35 U.S.C. 154(b) by 0 days.

(21) Appl. No.: 14/083,346

(22) Filed: Nov. 18, 2013

(51) Int. Cl.
*A63F 1/04* (2006.01)
*A63F 9/24* (2006.01)
*A63F 13/00* (2014.01)
*A63F 1/02* (2006.01)
*A63F 1/00* (2006.01)

(52) U.S. Cl.
CPC ... *A63F 1/02* (2013.01); *A63F 1/00* (2013.01); *A63F 1/04* (2013.01); *A61F 3/0423* (2013.01); *A63F 2001/0441* (2013.01)
USPC .................. 463/9; 273/292; 273/299; 463/19

(58) Field of Classification Search
CPC ............... A63F 1/00; A63F 1/02; A63F 1/04; A63F 2001/00; A63F 2001/04
USPC .................. 273/236, 292, 299; 434/128–129; 463/9, 19
See application file for complete search history.

(56) References Cited

U.S. PATENT DOCUMENTS 4,440,398 A 4/1984 Charon
4,671,515 A * 6/1987 Burgess ........................ 273/293
4,877,255 A 10/1989 von Braunhut
5,213,334 A * 5/1993 Yih ............................... 273/292
5,409,237 A * 4/1995 Marcley et al. ............... 273/299
5,863,043 A * 1/1999 Bitner ........................... 273/299
6,234,486 B1 * 5/2001 Wallice ......................... 273/299
6,557,854 B1 * 5/2003 Jaspers ......................... 273/272
7,367,564 B2 5/2008 Latell
7,785,183 B1 * 8/2010 Stockham et al. .............. 463/13
2003/0230848 A1 * 12/2003 Mellerowicz ................. 273/272
2005/0212215 A1 * 9/2005 Loke ............................. 273/302
2008/0036149 A1 * 2/2008 Hughes et al. ................ 273/292
2008/0042356 A1 2/2008 Ahmad et al.
2008/0252014 A1 * 10/2008 Hathorn ........................ 273/299

(Continued)

FOREIGN PATENT DOCUMENTS

GB 2 091 112 A 7/1982
GB 2 137 513 A 10/1984

OTHER PUBLICATIONS

"Cinco: The First Original Kuwaiti Game Ever!", website, retrieved as of Oct. 10, 2013, from www.cinc0.com, four pages.

*Primary Examiner* — Dmitry Suhol
*Assistant Examiner* — Jason Yen
(74) *Attorney, Agent, or Firm* — Richard C Litman

(57) ABSTRACT

A card game and method for playing a card game are provided for a plurality of players. A pre-determined number of cards are included in the card deck. A preset number of cards from the card deck are dealt to each player. Each card has a face with a variety of characters, written instructions, numeric fractional values, shapes, mathematical symbols, special characters, or lines. In embodiments of the card game, a designated winning word is spelled or a designated number of matching cards are obtained, with consideration to the operation instructions of a number of cards that can alter the arrangement of the cards in a player's hand or can alter the order of play of the card game. Once a current designated player obtains the designated word or the designated number of matching cards and has a winning combination of cards, that player wins and the game is over.

1 Claim, 11 Drawing Sheets

(56) References Cited

U.S. PATENT DOCUMENTS

2008/0311546 A1 12/2008 Wang
2010/0078891 A1* 4/2010 Factor .......................... 273/272
2011/0037224 A1* 2/2011 McKay ........................ 273/272
2011/0074107 A1 3/2011 Rowe
2012/0098199 A1* 4/2012 Scriven ........................ 273/299
2012/0098200 A1 4/2012 Sidler

* cited by examiner

CARD GAME AND METHOD FOR PLAYING A CARD GAME

BACKGROUND OF THE INVENTION

1. Field of the Invention

The present invention relates to a card game. More particularly, the present invention relates to a card game having a series of cards including shapes, symbols, and written instructions that, when combined and followed, result in a winning hand.

2. Description of the Related Art

Card games are an enjoyable past time and are for amusement, educational, and entertainment purposes. Many card games are designed to test the strategic ability as well as test the attentiveness of each individual player. There is an element in the manner of play that generates delight of a player in a card game. For many players it is the perception of luck that is the driving force to play the game. Other players rely on the competitiveness and subsequent triumph as the driving force to play. For other players, the perceived level of skill to affect the outcome is key.

Many common card games are played with a deck of 52 playing cards which typically includes thirteen ranks of each of four suits: clubs, diamonds, hearts, and spades, with "court" or face cards. Each suit of the common card games includes an ace, depicting a single symbol of its suit, a king, queen, and jack, each depicted with a symbol of their suit; and ranks two through ten, with each card depicting that number of symbols of its suit. Common playing cards also carry index labels on opposite corners so that the card can be identified when held in a fan from left to right, regardless of which of the two narrow edges faces up. In addition to these traditional 52 cards, commercial decks often include between one and four jokers, most often two. These jokers are not used in most basic game rules, but have a variety of uses with rule variations, and can simply serve as "spares" to replace a damaged or lost card.

Card games are known which incorporate a set of cards displaying letters or instructions in the playing of the game. Card games of this type are British Patent Document GB 2 091 112 A, which discloses a card game consisting of a pack or deck of cards that are used to spell a name in winning the game. The card sheets are imprinted with letters useful in pairing with other cards sheets by juxtaposing the letters on one sheet to those on another sheet such that a completed word is constructed. The letters are arranged at locations on one face of the cards to facilitate the word composition.

The US Patent Application Publication No. 2008/0311546 A1, to Wang, describes a game for spelling words that is based on the Roman alphabet, but which is applicable to and useful with other languages such as Chinese and others. The object of the game is to eventually spell words using the cards available.

There appears to be a need for a card game that includes features related to elaborate interplay between cards relating to different images, letters, and unique game instructions in the method of playing the game. Thus, such a card game providing the aforementioned features is desired.

SUMMARY OF THE INVENTION

Embodiments of apparatuses include various sets of cards and also embodiments include methods for playing a card game with a set of cards, each of the cards has a front and a back, the set of cards including a plurality of cards having a plurality of subsets of cards, the cards from each subset displaying a number of characters, written instructions, numeric fractional value, shapes, mathematical symbols, special characters or lines, wherein a spelling of a designated word or a matching of a specified number of cards in a player's hand is based on various cards in a player's hand and one or more operations of cards which can affect the play of the players.

In embodiments, each card of the various subsets of cards has a front face bearing a number of characters, written instructions, numeric fractional value, shapes, mathematical symbols, special characters, or lines. The cards of the various subsets of cards also has a back face, the back face can include a blank face or can also bear a variety of characters, written instructions, numeric fractional value, shapes, mathematical symbols, special characters, or lines.

An objective of the game is to obtain a number of cards to either spell a designated word or match a certain number of identified cards. Scoring is accomplished by combining a number of letters to spell a designated word or matching a designated number of cards with the same shape or character. A player to obtain the designated word or match the designated number of cards wins and the game ends.

In embodiments, for example, to begin the method in the play of the game, the cards are shuffled and cards are dealt to each player including the dealer. The remainder of the cards is placed in the center of the players and is known as the withdrawing deck.

Any player can be chosen to be the dealer, including the player who won a previous game. Any player can also be chosen to initiate the game, including the player who won a previous game. The first player has a choice of discarding cards from the player's hand in a discard pile. If the player selects to discard any cards, the player must obtain the same number of cards that were discarded, from the withdrawing deck. The player can only discard and withdraw cards once per the player's turn.

If there is an instance in which the cards in the withdrawing deck are exhausted, a player or any player selected for this purpose can shuffle the cards in the discard deck and place it in the location of the previous withdrawing deck. This deck is now the current withdrawing deck. The player that created the new withdrawing deck can then take one card from the withdrawing deck and place it in a location near the withdrawing deck. This can be the new discard pile.

After the player re-establishes his personal set of cards or maintains his current set of cards, the player can then attempt to match cards or spell a word based on the cards as represented in the player's hand from various subsets of cards.

If the player does not have the designated word or match the designated number of cards, the player can selectively implement any card in the player's possession whose operation can affect the number of cards in the hand of one or more players, an arrangement of one or more cards in the hand of one or more players or the order of play of the card game.

After a player has been determined to have a non-winning hand, the rotation or turn is moved to a next player as the current designated player. The current designated player then has the opportunity to discard cards, withdraw new cards or maintain the same cards in the player's possession for attempting to obtain a winning hand.

Play continues by each player selectively determining whether to discard and withdraw new cards, implementing card operations, and attempting to obtain a winning hand during the player's turn of play. The game continues in this fashion until one player obtains the winning hand and declares it. When a player obtains the winning hand, the player can say "CINCO" or another agreed upon signal. That player is deemed the winner, the other players are no longer able to win, and the game is over.

These and other features of the present invention will become readily apparent upon further review of the following specification and drawings.

BRIEF DESCRIPTION OF THE DRAWINGS

Unless otherwise indicated, similar reference characters denote corresponding features consistently throughout the attached drawings.

DETAILED DESCRIPTION OF THE PREFERRED EMBODIMENTS

With reference now to the drawings, in particular to FIGS. 1 to 9 thereof, apparatuses and methods for a card game embodying features, principles and concepts of various embodiments of the card game will be described.

Figure 1:
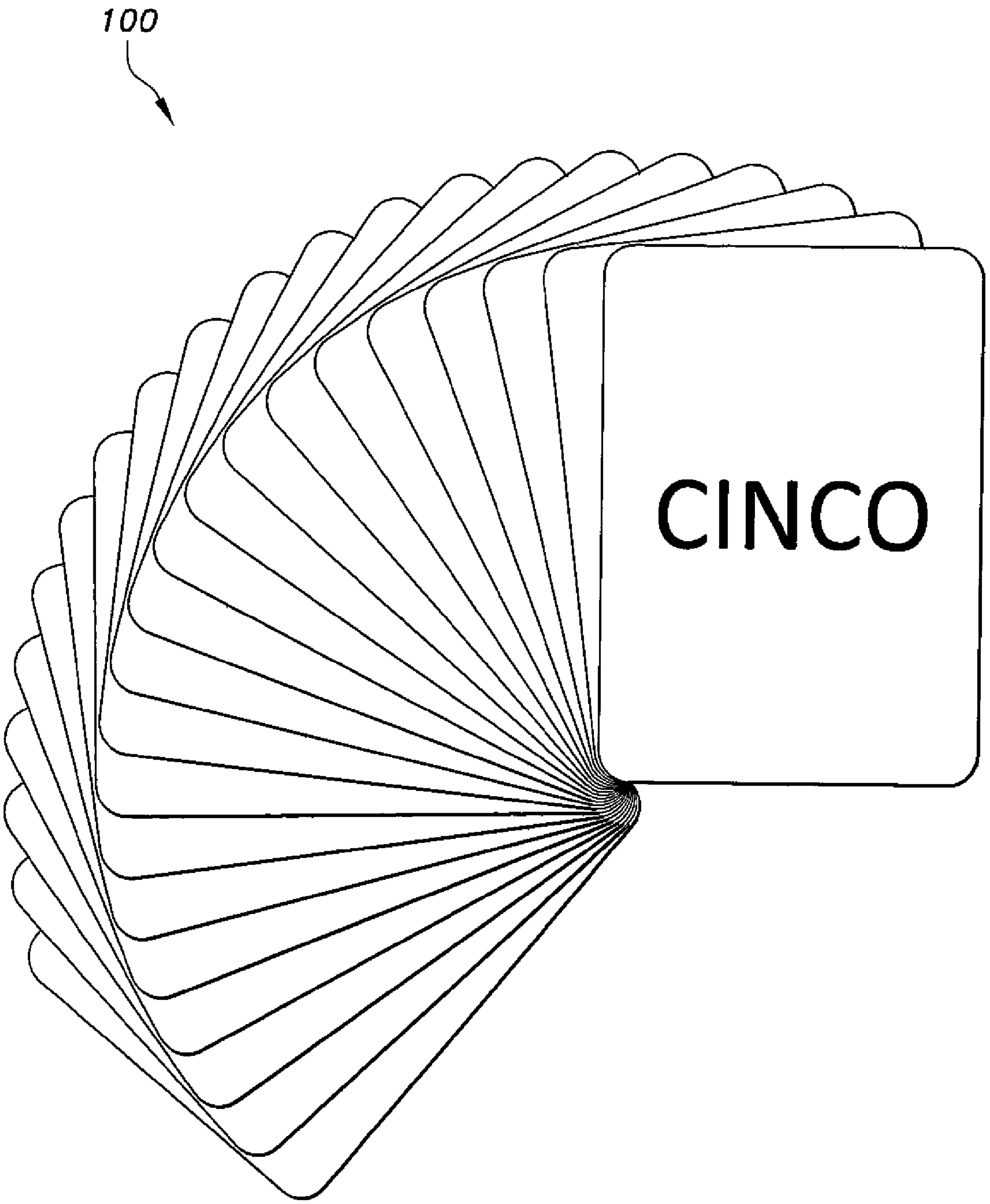
FIG. 1 is a top plan view of the plurality of cards used in embodiments of the card game, with the back face of one card exposed to illustrate features thereof according to the present invention.

Referring to FIG. 1, there is illustrated a card game including an exemplary deck of cards 100. The card game using the deck of cards 100 is a rousing and fun game geared toward using a variety of characters, instructions, shapes, symbols, and lines to result in a winning hand. The various embodiments shown are for illustrative and simplicity purposes, but should not be construed in a limiting sense, in that the various embodiments are not limited to the illustrations shown and additional characters, instructions, shapes, symbols, or lines can be represented or used in the card game. The card game played with the deck of cards 100 is an interactive game that requires player participation and attention to detail. The game cards of the card deck 100 are configured to encourage strategic agility, logic analysis, and deliberation from the players, for example.

The distinct cards of the card deck 100 include various distinct subsets of cards used in the card game, as illustrated in the subsets 200-500 of FIGS. 2-5B, for example, with each subset of cards having a distinct set of cards. The cards from each subset of cards correspond to various functions, operations, or other actions used in playing the card game. In embodiments, for example, once a player achieves a winning hand of a designated word or the designated number of matching cards using the cards in the player's hand, based on one or more functions, operations, or actions of cards in the player's hand, that player wins the game and the game is over.

In various embodiments, the designated word of the winning hand can be "CINCO", but other words can be used for the designated word of the winning hand and is not limited in this regard. In various embodiments, the designated number of matching cards using cards in the player's hand can be five matching cards, but another total number for matching cards can be used and is not limited in this regard. In order to win the card game, the player must adhere and follow the rules of the game accordingly. Exemplary rules for playing the card game are presented in Table I, but should not be construed in a limiting sense in that players can add, delete, or change one or more of the rules to play the card game.

TABLE I

| Basic Rules of Play | |
|---|---|
| Rule 1: | There are a multitude of cards. For purposes of illustration, the number of cards will be one hundred and forty (140). |
| Rule 2: | There can be a plurality of players involved in the card game. For purposes of illustration, the typical range of the players can be from two to eight players but is not limited in this regard. |
| Rule 3: | Cards are distinguished as four groups, with each group having a different visual representation. A first group of cards display a character representation, a second group of cards show written instructions, a third group of cards depict numeric fractional values, and a fourth group of cards display several shapes, mathematical symbols, special characters, and lines. |
| Rule 4: | There must be a dealer. For purposes of illustration and simplicity, the dealer will be a human dealer. |
| Rule 5: | Each player is given a pre-determined number of cards. For purposes of illustration, the number of cards to be dealt to each player will be ten. |
| Rule 6: | After each player is given a pre-determined number of cards, the remaining cards are placed in a stack. This stack will be the cards that a player will draw from when the player discards any unwanted cards in their possession. |
| Rule 7: | Any unwanted cards by players will be placed in a separate discard stack. |
| Rule 8: | Once the drawing stack does not have any remaining cards, the discard stack will be shuffled and become the new withdrawing stack. |
| Rule 9: | A player must start the game. |
| Rule 10: | At the applicable player's turn, the player can discard any card that the player does not intend to keep into a discard deck and withdraw a new card from the withdrawing deck. |
| Rule 11: | Players cannot swap cards freely without instruction from a card ordering a card swap. |
| Rule 12: | Once the cards from the withdrawing deck are finished, the cards in the discard deck are shuffled and used for continuation of game play. |
| Rule 13: | Players must follow the instruction of another player's card or cards that can be implemented against their own cards. |
| Rule 14: | Once a player determines the cards in the player's hand form a non-winning hand, that player's turn is over and the rotation moves to the next player. The rotation cannot occur unless that player has the designated number of cards to continue game play, such as ten cards in the player's possession. |
| Rule 15: | If a player has a plurality of cards with multiple operations, the player can perform the operations in an order of an operation that operates on a solitary card and can then perform an operation of a card that operates on a plurality of cards. |

TABLE I-continued

| Basic Rules of Play | |
|---|---|
| Rule 16: | In order for a player to win, a player must collect a designated word or a designated number of matching cards. In addition to the designated word or the designated number of matching cards, the player must also have a designated number of cards. For example, a player can have a designated word such as "CINCO" but the player must also have the total designated number of cards in the player's hand, such as ten cards to win the card game. |
| Rule 17: | The game ends once a player wins. |

Accordingly, in playing the game, the game can include the card deck 100 having, for example, one hundred and forty cards (but can have more or fewer cards) forming the card deck 100, and should not be construed in a limiting sense. Each card in the card deck 100 can have on a face, such as on the card's front face, a variety of characters, written instructions, numeric fractional value, shapes, mathematical symbols, special characters, or lines. The card deck 100 includes a plurality of subsets of cards, the cards from each subset distinctly displaying a variety of characters, written instructions, numeric fractional value, shapes, mathematical symbols, special characters, or lines, for example.

Figure 2:
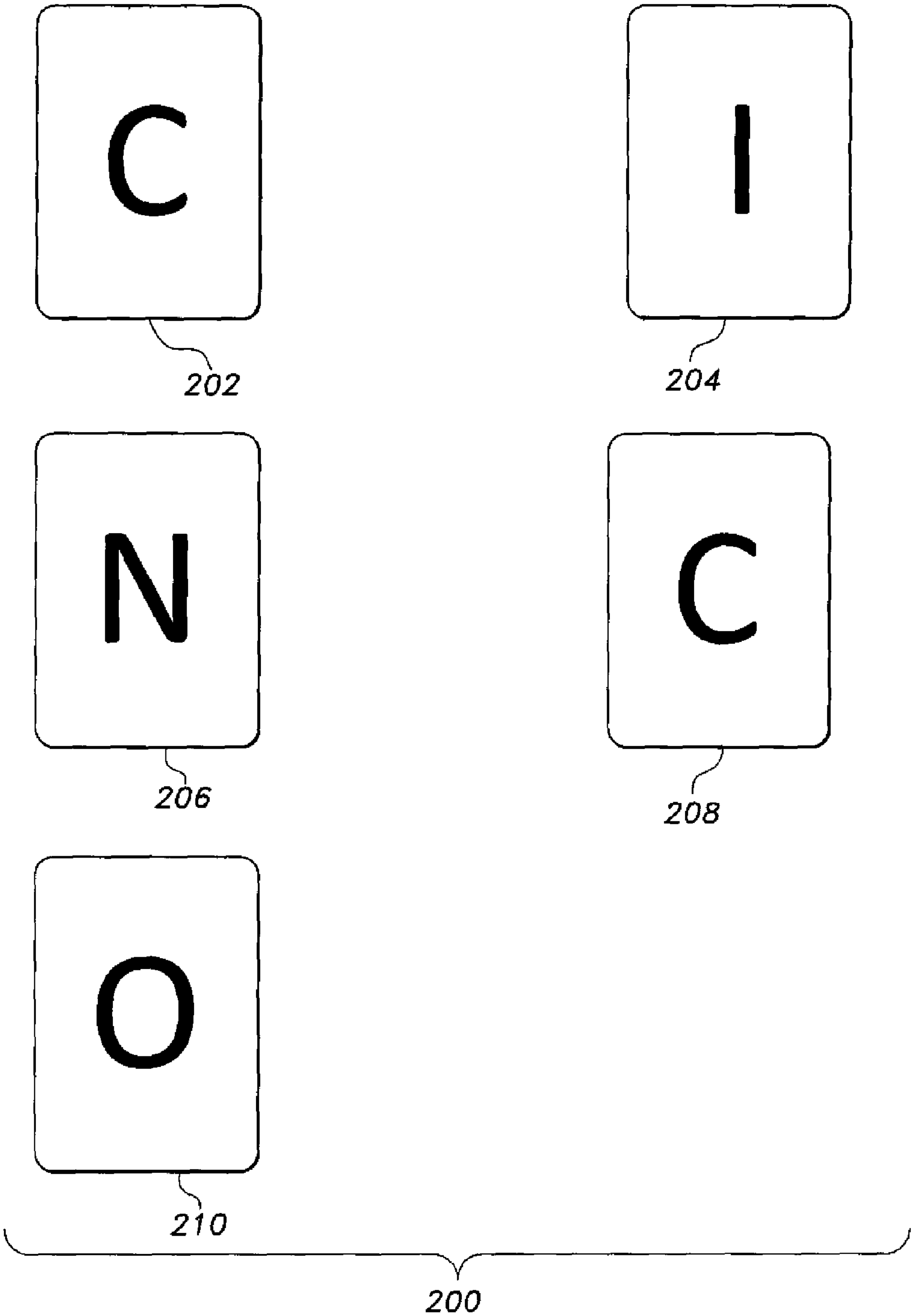
FIG. 2 is a front view of a front face of a first subset of cards depicting character letters according to present invention.

Referring to FIG. 2, a distinct first subset of cards 200 is illustrated with a range of cards 202-210, for example. Each card in the first subset of cards 200 displays a character which can be combined to create a word that can be the designated word to win the game. The variety, range, and number of characters in the first subset of cards 200 should not be construed in a limiting sense. For example, the characters illustrated on the cards 202-210 in FIG. 2 are: the character "C" card 202, the character "I" card 204, the character "N" card 206, the character "C" card 208, and the character "O" card 210, respectively. The number of letters in the designated winning word is ideally five but can be of any numbers of letters.

Figure 3A:
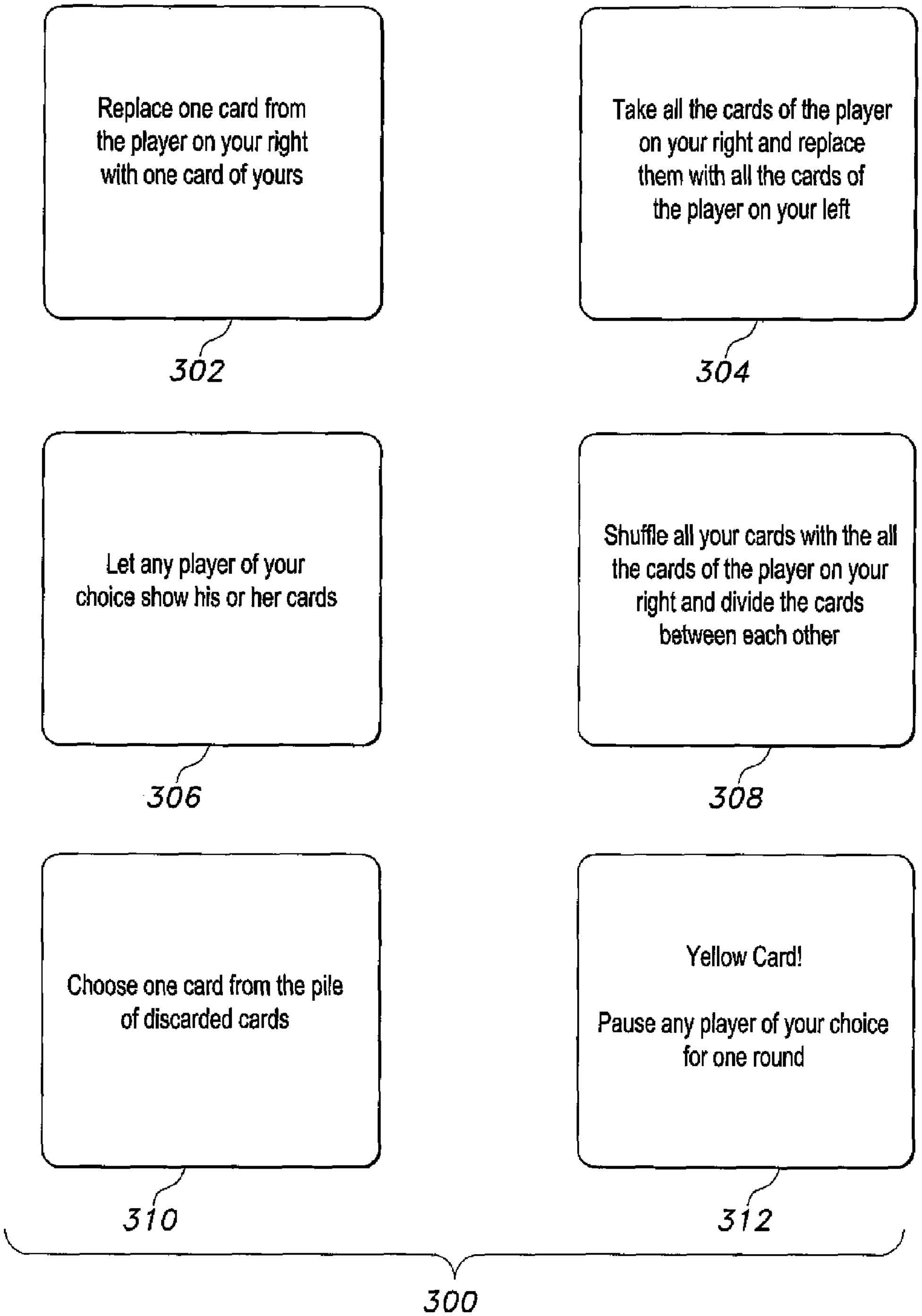
FIG. 3A and FIG. 3B are a front view of a front face of a second subset of cards displaying written instructions.

Referring to FIG. 3A, a distinct second subset of cards 300 is illustrated and includes cards displaying written instructions on the front face of the cards to assist in a method of play of the card game. The number of cards included in the second subset of cards 300 and the depictions thereon should not be construed in a limiting sense. The exemplary written instructions displayed on the cards of the second subset of cards of FIG. 3A are as follows: "Replace one card from the player on your right with one card of yours" card 302, "Take all the cards of the player on your right and replace them with all the cards of the player on your left" card 304, "Let any player of your choice show his or her cards" card 306, "Shuffle all your cards with all the cards of the player on your right and divide the cards between each other" card 308, "Choose one card from the pile of discarded cards" card 310, and "Yellow Card! Pause any player of your choice for one round" card 312.

Figure 3B:
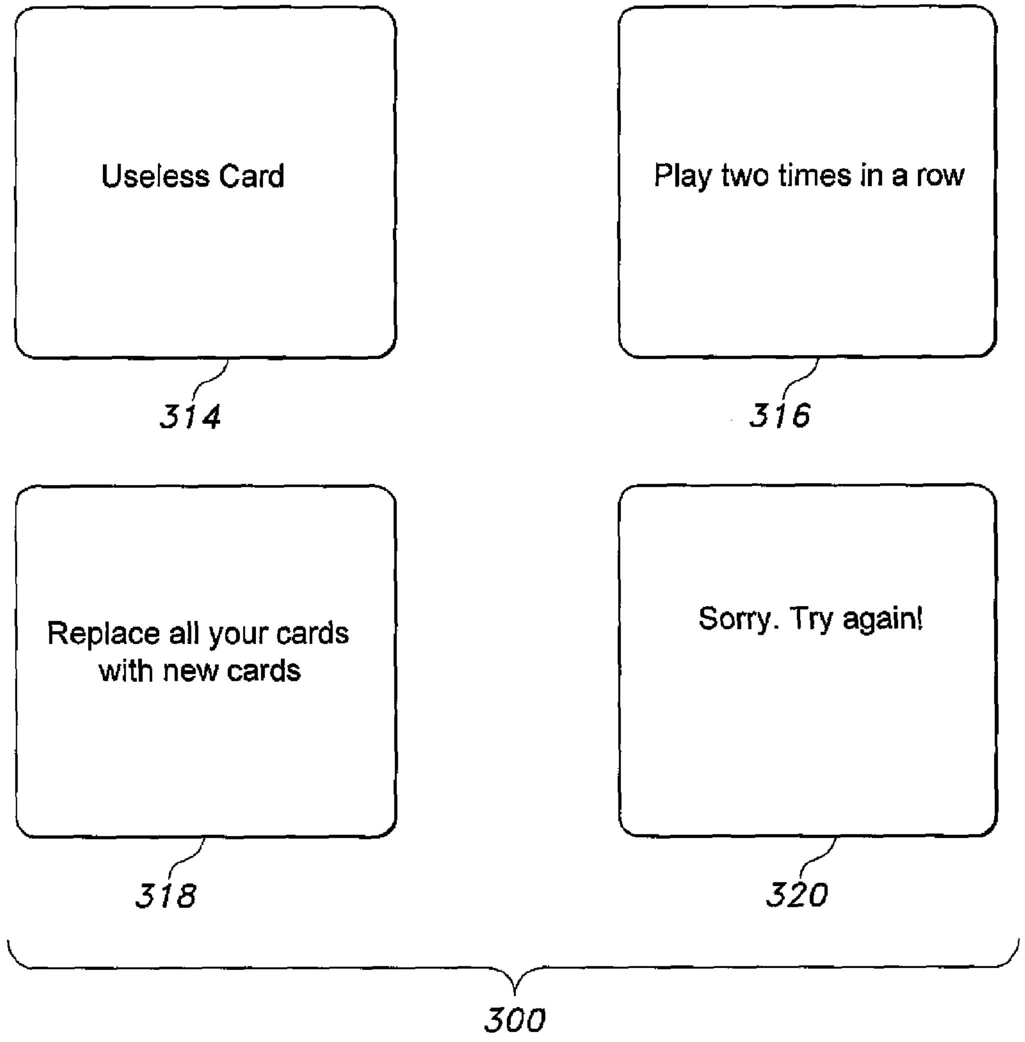

Referring to FIG. 3B, a distinct second subset of cards 300 is illustrated and includes cards displaying written instructions on the front face of the cards to assist in a method of play of the card game. The number of cards included in the second subset of cards 300 and the instructions displayed thereon should not be construed in a limiting sense. The exemplary written instructions displayed on the cards of the second subset of cards of FIG. 3B are: "Useless card!" card 314, "Play two times in a row" card 316, "Replace all your cards with new cards" card 318, and "Sorry. Try again!" card 320.

Figure 4:
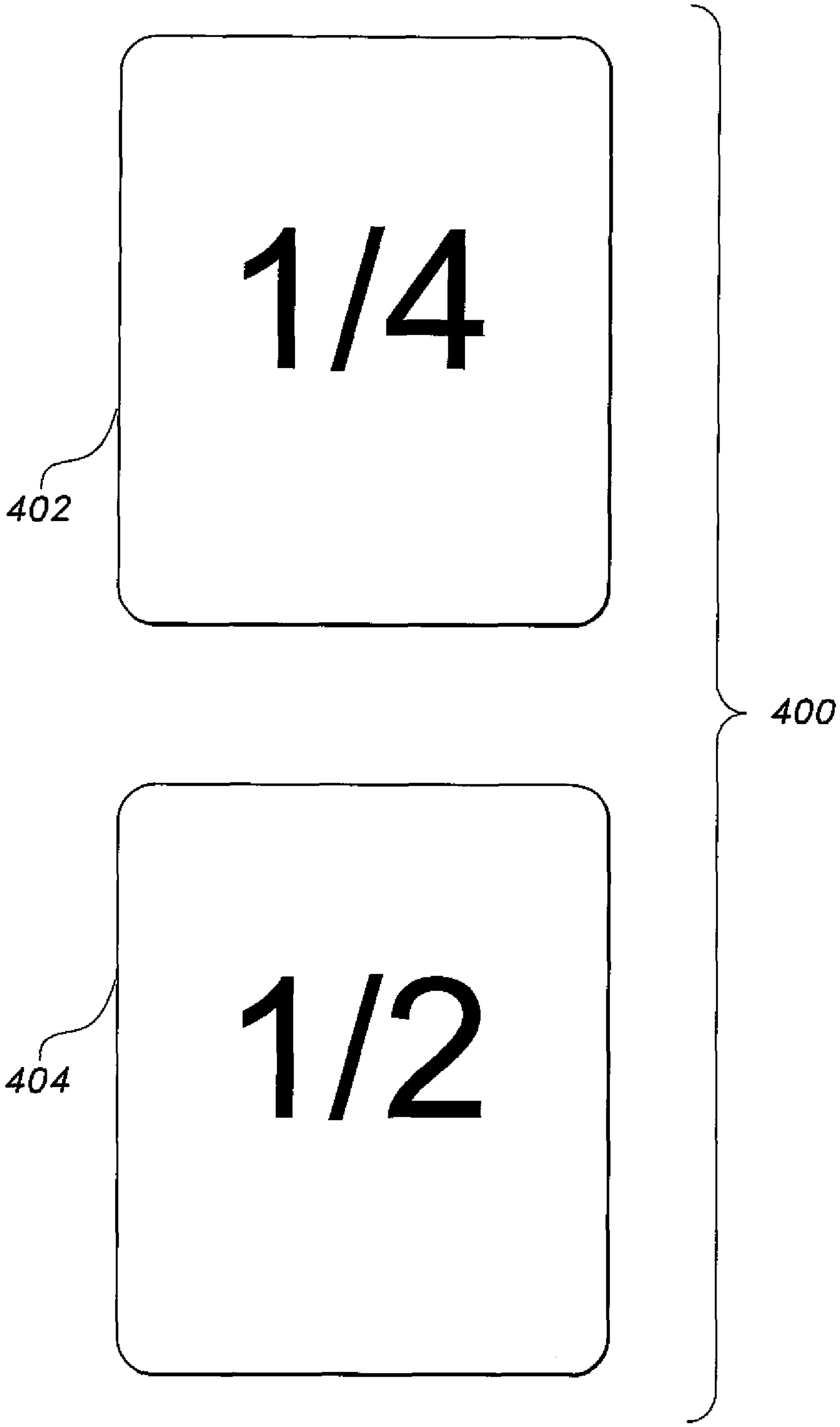
FIG. 4 is a front view of a front face of a third subset of cards illustrating numeric fractional values.

Referring to FIG. 4, a distinct third subset of cards 400 is illustrated in FIG. 4 and includes numeric fractional values depicted on the front face of the cards in the subset, for example: the numeric fractional value "¼" card 402 and the numeric fractional value "½" card 404. The cards in the third subset 400 can include one or more additional cards depicting one or more numeric fractional values displayed thereon in any arrangement. The third subset of cards 400 include one or more cards that indicate an operation to create a new card when at least two cards from the third subset of cards are combined, such as to create a card in the first subset of cards 200 or to create a card in a fourth subset of cards 500, such as combining two numeric fractional value "½" cards 404 to form a card, for example, as can be then used to form a part of a winning hand. The variety, range, and number of cards in the third subset of cards 400 and the numeric fractional values displayed thereon should not be construed in a limiting sense.

Figure 5A:
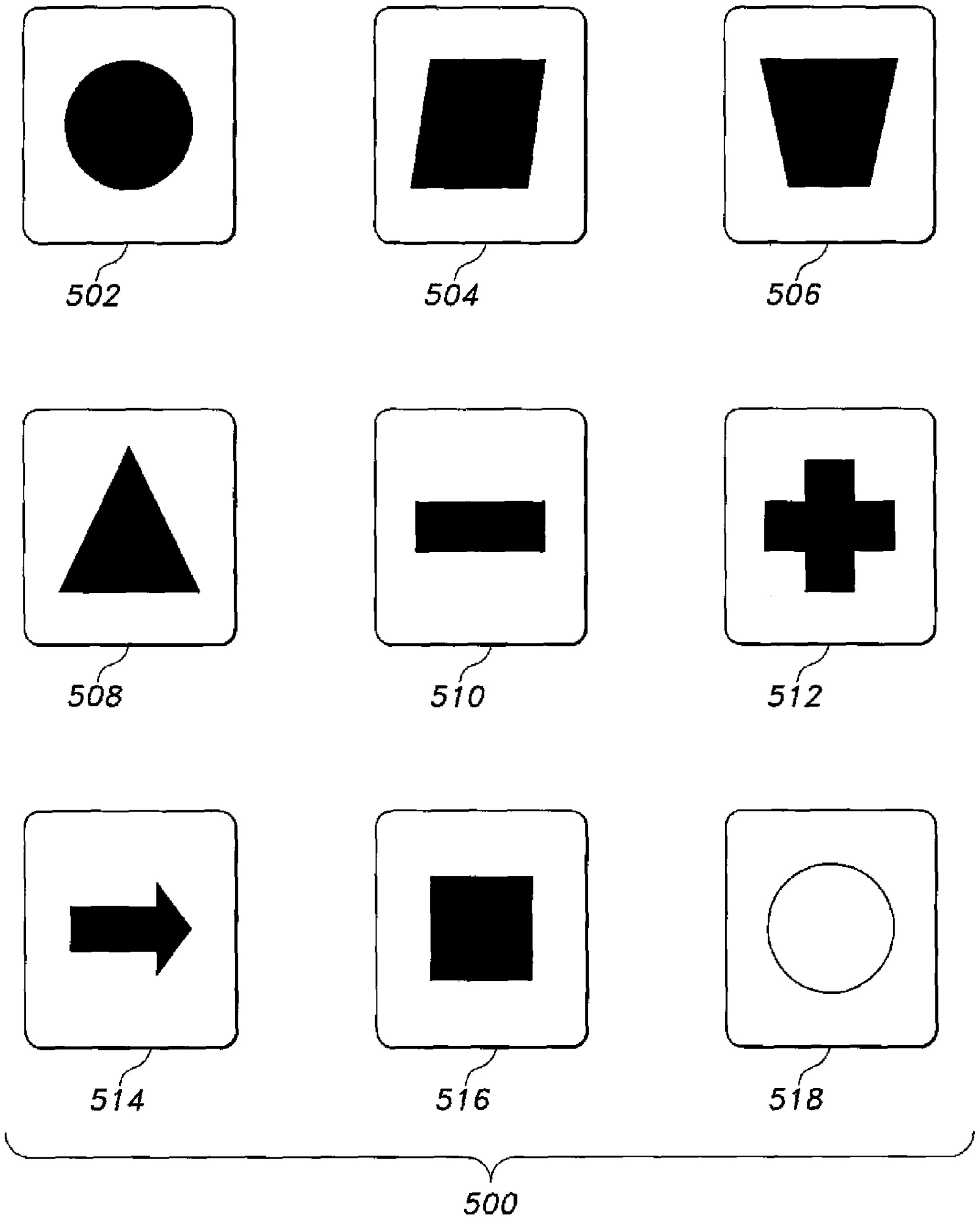
FIG. 5A and FIG. 5B are a front view of a front face of a fourth subset of cards depicting shapes, mathematical symbols, special characters, and lines.
Figure 5B:
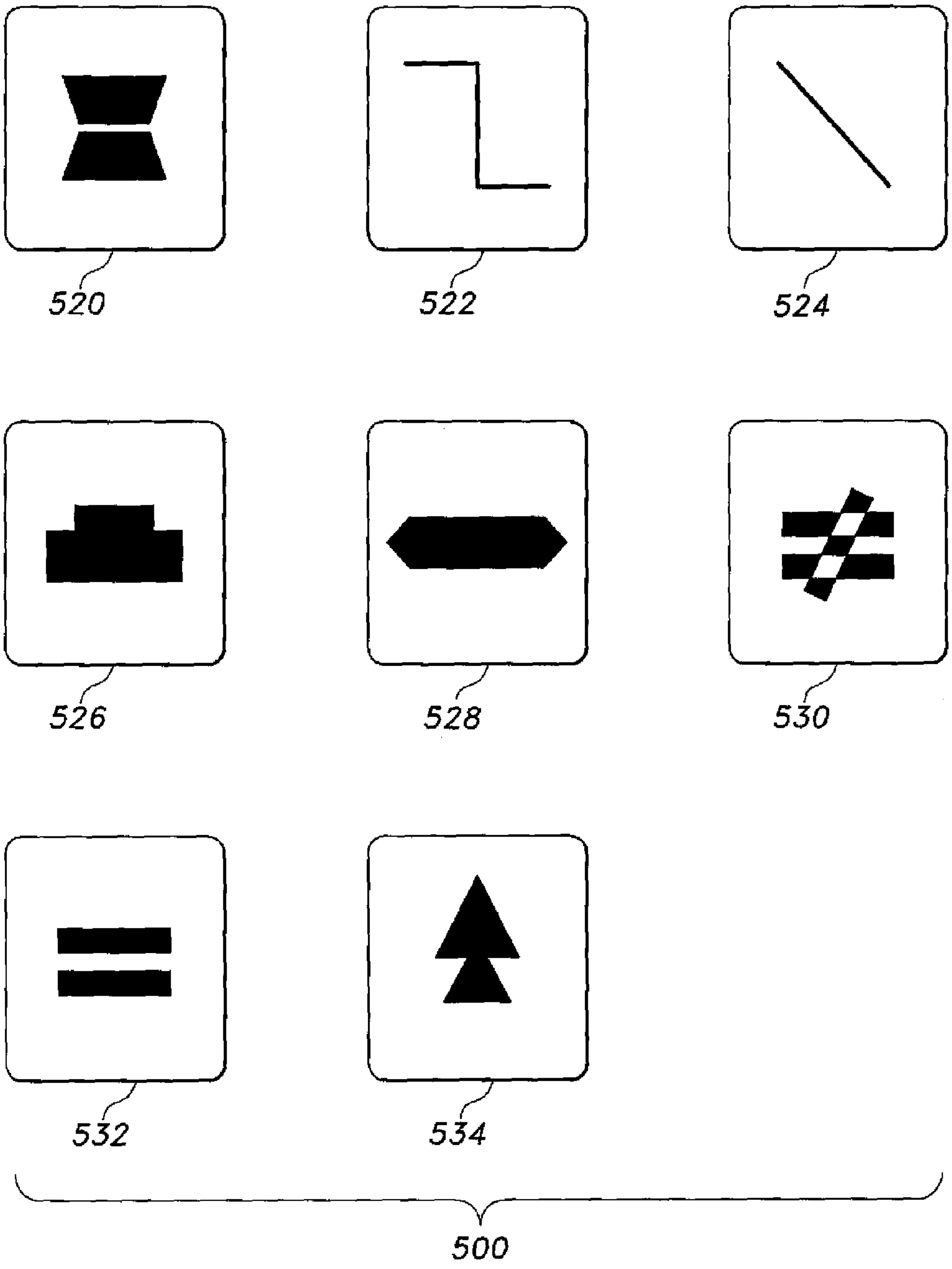

Referring to FIG. 5A and FIG. 5B, the distinct fourth subset of cards 500 is illustrated and includes cards displaying various shapes, mathematical symbols, special characters, and lines on the front face of the cards. The exemplary shapes, mathematical symbols, special characters, or lines displayed on the cards of the fourth subset of cards 500 of FIG. 5A are described as follows: a solid black circle card 502, a solid black rhomboid card 504, a solid black inverted trapezoid card 506, a solid black triangle card 508, a minus sign card 510, a plus sign card 512, a right pointing arrow card 514, a solid black square card 516, and an open circle card 518. The exemplary shapes, mathematical symbols, special characters, or lines displayed on the cards of the fourth subset of cards 500 of FIG. 5B are described as follows: a two trapezoids card 520, a line connector card 522, a forward slash card 524, a two linked rectangle boxes card 526, a hexagon card 528, a not equal sign card 530, an equal sign card 532, and a two linked triangles card 534. Special characters also can include various types and kinds of letters, numbers, symbols or punctuation marks, for example, and should not be construed in limited sense. Furthermore, the shapes, mathematical symbols, special characters, or lines displayed in FIG. 5A and FIG. 5B are only exemplary, so that other subsets may be formed that may have other shapes, mathematical symbols, special characters, or lines not shown in the drawings, or other groupings of shapes, mathematical symbols, special characters, or lines on a single card, or other groupings of the cards in the subsets 500. The variety, range, and number of cards included in the fourth subset of cards 500 and the depictions thereon should not be construed in a limiting sense and additional shapes, mathematical symbols, special characters, or lines can be added to the fourth subset of cards 500.

FIGS. 2-5B are representative of the four subsets of cards 200-500. Each subset of cards can have a range of and minimum number of cards, for example, but are not limited to this range and minimum number of cards. In the first subset of cards 200, the character cards can have twenty cards containing the letters of "CINCO" in the card deck 100. The second subset of cards 300 can have at least ten cards with various written instructions for play in the card deck 100. The third subset of cards 400 in the card deck 100 can have at least two cards illustrating numeric fractional values. Also, the third subset of cards 400 of the card deck 100 can also have ten cards that can be the equivalent of a quarter of one card or a half of one card, for example. The fourth subset of cards 500 can have, for example, seventeen to twenty cards of various shapes, mathematical symbols, special characters, or lines, and there can be 5 or more copies of each card in the fourth subset of cards 500 in the card deck 100. These cards from the various subsets of cards can be used to create a winning hand. Each subset of cards in the card deck 100 is distinct and separate from another subset of cards.

In order to play the card game, a player must spell a designated word or match a designated number of cards in the player's hand and apply various operation cards as can affect the arrangement or the display of one or more of the cards in one or more player's hands. Various card operations can also affect the card game rotation in one or more player's hands. The written instructions, operations, along with the variety of characters, numeric fractional values, shapes, mathematical symbols, special characters, or lines displayed on the various cards of the subsets of cards should not be construed in a limiting sense.

Embodiments of the card game typically provide for obtaining a winning hand by spelling the designated word or by having or creating the designated number of matching cards in the player's hand, as can be based on operations of cards which can change the arrangement of cards in a one or more player's hand. Players attempt to obtain the spelling of a designated word or attempt to have or create the designated number of matching cards, as can be agreed by all players, for example, in order to win the game. Various cards in the card deck 100 can have different characters, and including the letters listed in the alphabet, such as A-Z. Other cards can include various written instructions, shapes, mathematical symbols, special characters, or lines as exemplified in FIGS. 2-5B but are not limited in this regard and additional written instructions, shapes, mathematical symbols, special characters, or lines can be added.

The set of cards can include at least 140 cards, with at least four subsets of cards, as discussed, which are used in determining a winning hand. However, unlike a standard deck of cards, which incorporates a set range of cards and no card performing an operation on another card, the card deck 100 can have an open range for cards and can include cards that can alter an arrangement of one or more cards in a hand of one or more players by various operations or the cards can alter the ability of one or more players to play the card game. In examples of various methods for playing the card game, winning is accomplished by spelling the designated word from cards of one subset of cards or by having or creating the designated number of matching cards from one or more subsets of cards. A player to either spell the designated word or have or create the designated number of matching cards, based on the cards from the subsets in the player's hand, is the winner and the game ends.

Figure 6:
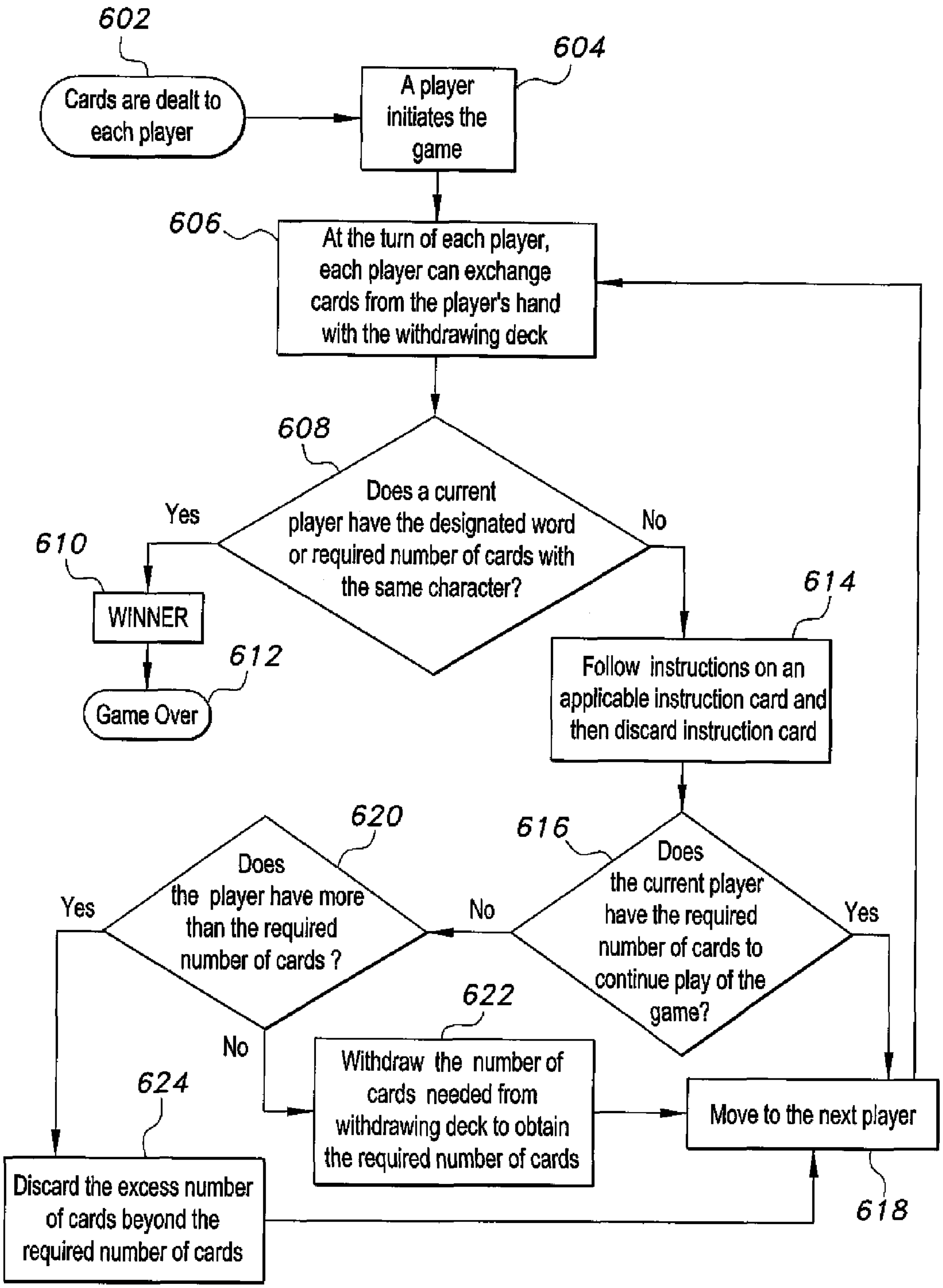
FIG. 6 is a flow chart illustrating an embodiment of a method of playing the card game according to the present invention.

Referring now to FIG. 6, various embodiments of methods for playing the card game are described schematically with respect to FIG. 6 using the card deck 100. For example, after the set of cards of the card deck 100 are shuffled, the dealer deals out ten cards from the card deck 100 to each player at step 602, and the remainder of the cards from the card deck 100 are placed in the a convenient location as to the players to form the withdrawing deck. The dealer can take one card from the withdrawing deck and place it beside the withdrawing deck. This is called the discard pile.

The dealer or other selected player initiates the game at step 604. Any player can be selected to initiate the game at step 604, including the player who won a previous game. Once the game is initiated at step 604, the game can be played in a clockwise rotation, but is not limited in this regard.

The current player in rotation has the option of discarding cards from his or her hand into the discard pile and picking up the same number of cards from the withdrawing deck that were discarded at step 606. The player can only discard and withdraw cards once per the player's turn. After the player either maintains the player's current set of ten cards or replaces the discarded cards from the withdrawing deck to again have a hand of a set of ten cards, the player can then determine whether the player has the designated word or the designated number of matching cards in the player's hand, based on the cards from the one or more subsets represented in the player's hand at step 608.

If there is an instance in which the cards in the withdrawing deck are exhausted, a current player, or any player selected for this purpose, can shuffle the cards in the discard deck and place it in the location of the previous withdrawing deck. This deck is now the current withdrawing deck. The player that created the new withdrawing deck can then take one card from the withdrawing deck and place it in a location near the withdrawing deck. This can be the new discard pile.

If the current player does not have the designated word or the designated number of matching cards at step 608, the play proceeds to step 614. At step 614, the play can implement any card in the player's possession whose operation can affect the arrangement or display of one or more cards in one or more player's hands or affect the order of play of one or more players of the card game. After any implementation of any card in the player's possession whose operation can affect the arrangement or display of one or more cards in one or player's hands or the order of play of one or more players of the card game, the player discards that specific operation card.

If the player has the required number of cards in his or her hands at step 616, the rotation or turns moves to the next player at step 618. If the player does not have the required number of cards in his or her hand, the player checks whether the player has more than the required number of cards at step 620 and, if the player has more than the required number of cards, the player discards the excess number of cards at step 624. If at step 620 the player determines the player does not have more than the required number of cards, the player proceeds to step 622 and withdraws the number of cards needed from the withdrawing deck to obtain the required number of cards. Once the player has obtained the correct required number of cards at either step 624 or step 622, the rotation or turn is moved to the next designated player at step 618 and the play of the game continues at step 606 giving the new current designated player the option of replacing unwanted cards from the new current designated player's hand with cards from the withdrawing deck.

The game continues in this fashion until one player obtains either the designated word or the designated number of matching cards. When a player obtains either the designated word or designated number of matching cards at step 608, the player can say "CINCO" or another agreed upon signal, but is not limited in this regard. That player is deemed the winner at step 610, the other players are no longer able to win, and the game is over at step 612.

The following example illustrates a method of playing the card game among a plurality of players, and should not be construed in a limiting sense. In this regard, for example, the dealer (player 1) deals ten cards to player 2, player 3, and dealer (player 1), respectively at step 602. In this example, player 1 will be selected as the player to initiate the game at step 604. Player 1 looks at the cards in player 1's possession and decides to discard three cards into the discard deck and to withdraw cards from the withdrawing deck at step 606. The cards in player 1's possession are now the following cards: the character "C" card 202, the character "I" card 204, the character "N" card 206, the solid black inverted trapezoid card 506, the solid black inverted trapezoid card 506, the solid black inverted trapezoid card 506, the character "C" card 202, the equal sign card 532, the solid black circle card 502 and the solid black triangle card 508. As player 1 does not have the designated winning word "CINCO", for example, nor does player 1 have the designated number of matching cards for a winning hand, player 1's turn ends at step 608. Player 1 does not have any cards with instructions at step 614, confirms that he or she has the required number of cards at step 616, and the play proceeds to player 2 as the new current designated player at step 618.

Player 2, as the current designated player, has the following cards: the character "I" card 204, the character card "N" 206, the solid black square card 516, the solid black square card 516, the solid black triangle card 508, the solid black triangle card 508, the solid black triangle card 508, the open circle card 518, the open circle card 518, and the forward slash card 524. Player 2 looks at the cards in player 2's possession and discards the character "I" card 204, a character card "N" 206, and the forward slash card 524 at step 606. Player 2 takes three cards from the withdrawing deck. The cards in Player 2's possession are now: the solid black square card 516, the solid black square card 516, the solid black square card 516, the solid black triangle card 508, the solid black triangle card 508, the solid black triangle card 508, the open circle card 518, the open circle card 518, the character "C" card 202, and the written instruction "Replace all your cards with new cards" card 318.

As player 2 does not have the designated winning word "CINCO", for example, nor does player 2 have the designated number of matching cards for a winning hand, player 2's turn ends at step 608. Player 2 does have a written instruction card and follows the instruction at step 614. As player 2 has the written instruction "Replace all your cards with new cards" card 318, player 2 discards all cards in player 2's possession and obtains all new cards at step 614. The cards in player 2's possession are now: the open circle card 518, the open circle card 518, the equal sign card 532, the right pointing arrow card 514, the right pointing arrow card 514, the solid black square card 516, the plus sign card 512, the character "N" card 206, the character "N" card 206, and the line connector card 522. As player 2's turn was over at step 608, player 2 followed the written instruction at step 614, player 2 confirmed that he or she has the required number of cards at step 616, and the play proceeds to player 3 as the new current designated player at step 618.

Player 3, as the current designated player, looks at the cards in player 3's possession. The cards in player 3's possession are the forward slash card 524, the two trapezoids card 520, the not equal sign card 530, the equal sign card 532, the linked triangles card 534, the solid black rhomboid card 504, the solid black rhomboid card 504, the line connector card 522, the character "C" card 208, the character "O" card 210. Player 3 decides to discard five cards. The cards in player 3's possession are now: the forward slash card 524, the two trapezoids card 520, the not equal sign card 530, the not equal sign card 530, the not equal sign card 530, the linked triangles card 534, the solid black square card 516, an open circle card 518, the solid black square card 516, and the character "O" card 210.

As player 3 does not have the designated winning word "CINCO", for example, nor does player 3 have the designated number of matching cards for a winning hand, player 3's turn ends at step 608. Player 3 does not have any cards with instructions for step 614, confirms that he or she has the required number of cards at step 616, and the play proceeds back to player 1 as the new current designated player at step 618.

Player 1 is the current designated player again and the cards in player 1's possession are still the character "C" card 202, the character "I" card 204, the character "N" card 206, the solid black inverted trapezoid card 506, the solid black inverted trapezoid card 506, the solid black inverted trapezoid card 506, the character "C" card 202, the equal sign card 532, the solid black circle card 502 and the solid black triangle card 508. Player 1 looks at the cards in player 1's possession and decides to discard two cards at step 606.

Figure 7:
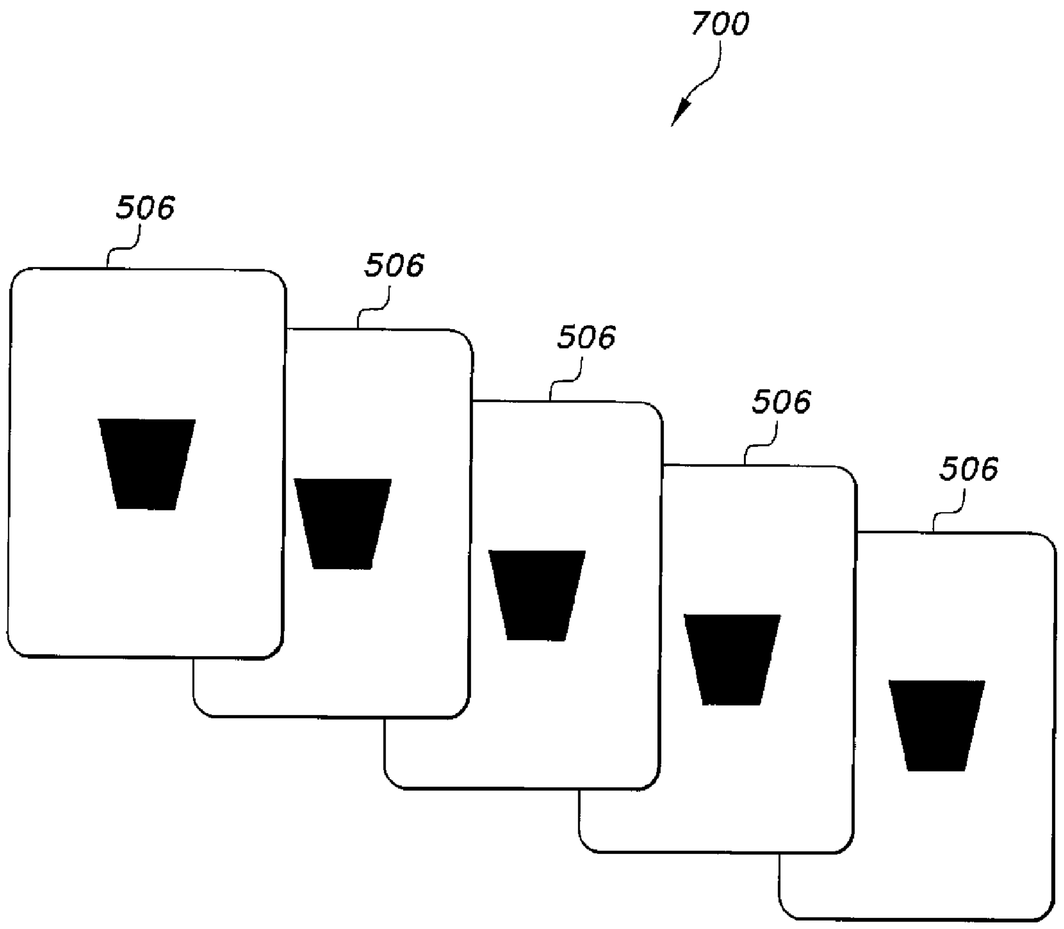
FIG. 7 is a front view of the front faces of cards of an exemplary winning hand of a number of matching cards, the exemplary winning hand showing multiple cards from the same subset of cards involved in playing the card game according to the present invention.

The cards now in player 1's possession are: the character "C" card 202, the character "I" card 204, the character "N" card 206, the solid black inverted trapezoid card 506, the solid black inverted trapezoid card 506, the solid black inverted trapezoid card 506, the solid black inverted trapezoid card 506, the solid black inverted trapezoid card 506, the character "C" card 202, and the solid black circle card 502. Five of the ten cards in player 1's possession are matching cards and are shown in FIG. 7 of the set 700, for example. As illustrated in FIG. 7 player 1 confirms that he or she has a winning hand, e.g. five matching cards, at step 608, such as the five solid black inverted trapezoid cards 506. Player 1 proceeds to win the game at step 610 and the game ends at step 612.

Figure 8:
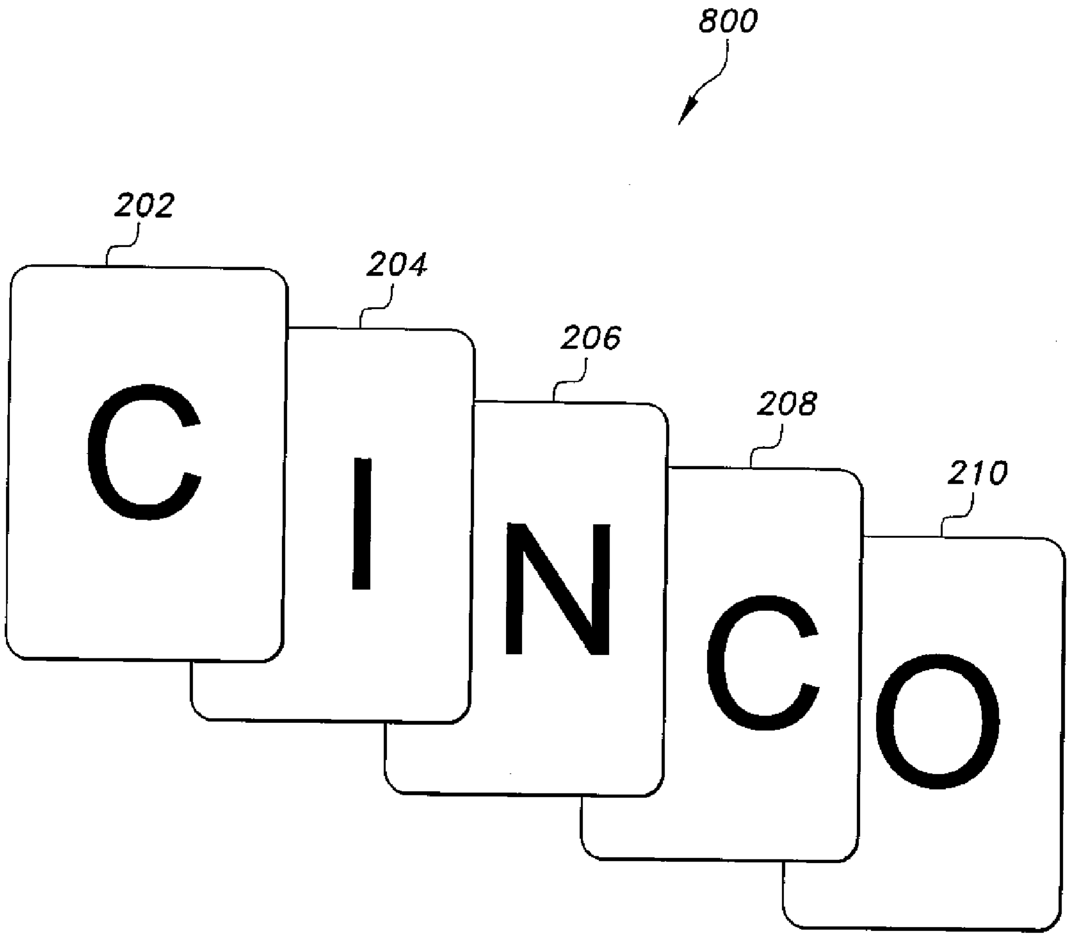
FIG. 8 is a front view of the front faces of cards of an exemplary winning hand of a number of cards spelling a word, the exemplary winning hand showing multiple cards from the same subset of cards involved in playing the card game according to the present invention.

FIG. 8 illustrates the front faces of cards of another exemplary winning hand including a winning combination of cards depicting the designated word, such as "CINCO". As illustrated in FIG. 8, the hand 800 includes the character "C" card 202, the character "I" card 204, the character "N" card 206, the character "C" card 208, and the character "O" card 210. Each card in the hand 800 represents a character for use in spelling the word "CINCO", but the designated word is capable of being any word and should not be limited in this sense.

Although embodiments has been described in terms of a set of cards, it will be appreciated that embodiments of the card game and methods for playing the card game can be applied to a computer game in which various subsets of cards and the instructions for playing the card game can be stored in a memory of and can be implemented by a computer implemented device, as well as the game and the cards of the game can be generated by the computer implemented device and can be displayed as images on a digital screen associated with the computer implemented device, such as a computer. The set of cards can therefore also be a set of virtual "cards" in such embodiments and the computer application includes hardware, such as can include processors and non-transitory memory, and software for adapting and implementing the processes and methods of FIG. 6 as an example of an algorithm in a computer-implemented application in playing the card game.

For example, when cards are dealt in a computer or digital game, one player can be human and one player can be the computer itself. The human player can interact with the computer player as the human player would with any other player. In addition to interacting with the computer player, the human player can also interact with various other players in various locations through a networking system, such as a local or global computer communication system.

Figure 9:
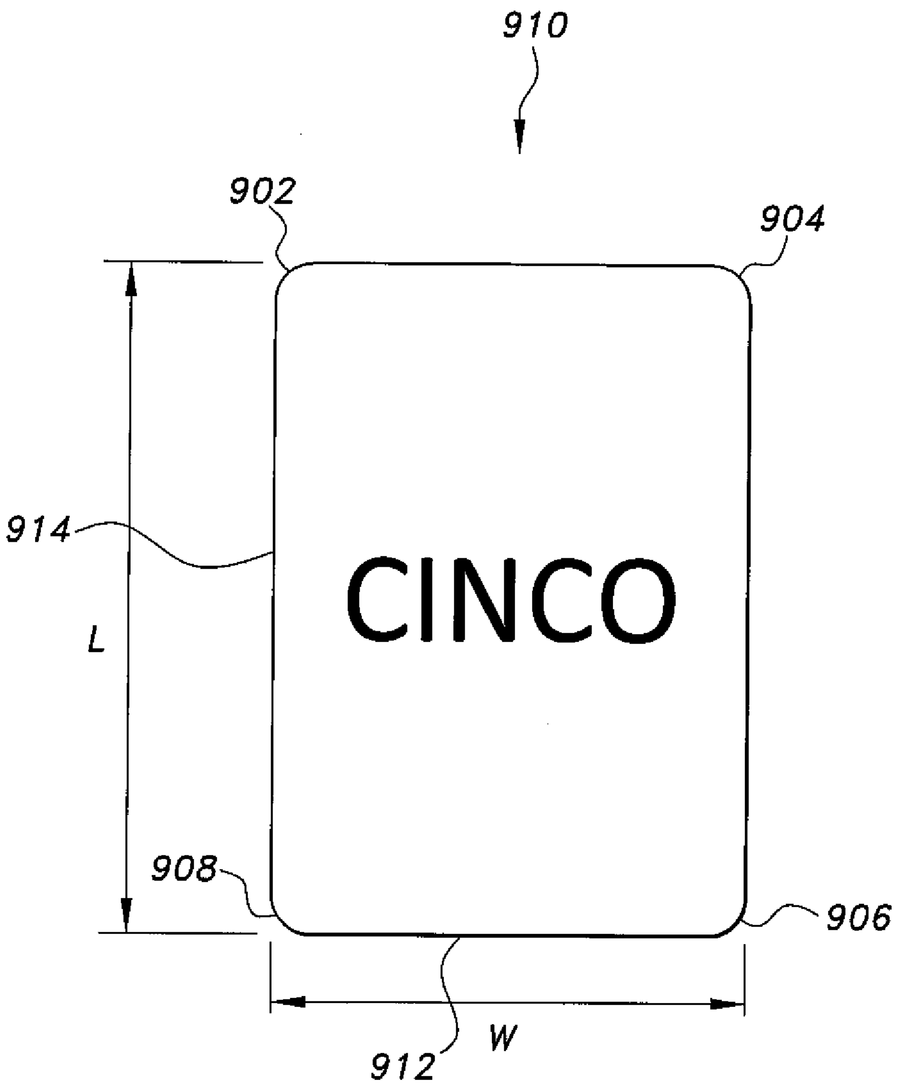
FIG. 9 is a front view of a card from the set of cards showing a card with rounded edges in the set of cards according to the present invention.

Also, referring to FIG. 9 an example of a card 910 of the card deck 100 of FIG. 1 is illustrated. The card 910 can be any suitable size, such as card of a size having a side 912 of a width W of about 2.5 inches and a side 914 of a length L of about 3.5 inches, for example, although the size of the card should not be construed in a limiting sense. Further, the corners 902, 904, 906, and 908 of the card 910 can be of various shapes, such as rounded corners or corners of a generally rounded shape, such as illustrated in FIG. 9, for example.

The cards in the card deck 100, such as card 910, can be formed to include any suitable material, such as from a paper material, a plastic material, a tile material, a metal material, etc. Each card in the card deck 100 can have a flat surface in which to display the card's numeric value, picture, character, or combination thereof. Additionally, the size of indicia on the front face or the size of indicia on the back face of the card, such as card 910, the indicia including, for example, the variety of characters, written instructions, numeric fractional values, geometric shapes, mathematical symbols, special characters, or lines, as displayed on a card from the card deck 100, can be one or more different sizes, a variety of sizes or of a same size, for example.

Therefore, embodiments of the card game provide game apparatuses and methods for playing a card game which are typically relatively simple and versatile so that players of various ages and levels of gamesmanship can enjoy the card game and benefit therefrom. Additional embodiments of the card game can provide for several language versions of the card game. Other embodiments of the card game can provide for several ranks of the card game, such as college and party versions.

Further, embodiments of the card game can provide a versatile card game that can be played through a variety of different methods, such as paper cards, digital & computer mediums, tiles and the like. Also, additional embodiments of the card game can provide a card game that can be played with an assortment of different colors and shapes displayed on the cards of the card game.

It is to be understood that the present invention is not limited to the embodiments described above, but encompasses any and all embodiments within the scope of the following claims.

I claim:

1. A method for playing a card game, the method comprising the steps of:

executing, with a processor, a program stored in a non-transitory memory of a computer implemented device, the program directing the computer implemented device to perform the following:

(a) generating a distinct set of cards by the computer implemented device, the distinct set of cards including a distinct first subset of cards with each card of the first subset of cards having a character displayed thereon, a distinct second subset of cards with each card of the second subset of cards having a written instruction displayed thereon, a distinct third subset of cards with each card of the third subset of cards having a numeric fractional value displayed thereon, and a distinct fourth subset of cards with each card of the fourth subset of cards having one or more shapes, symbols, characters, or lines displayed thereon, wherein:

i) the first subset of cards includes: a plurality of distinct cards, the plurality of distinct cards including a range of characters, each character in the range of characters assigned to and displayed on a corresponding card in the first subset of cards, the characters displayed including one or more letters from an alphabet;

ii) the second subset of cards includes: a card that indicates an operation to swap at least one card from the hand of at least one player of the card game, a card that indicates an operation to display at least one card from the hand of at least one player of the card game, a card that indicates an operation to prevent a player from winning the card game, and a card that indicates an operation to change the order of play of the card game;

iii) the third subset of cards includes: a distinct "¼" card that indicates an operation to create a new card in the player's possession based on combining the distinct "¼" card with at least one other numeric fractional value card from the third subset of cards, and a distinct "½" card that indicates an operation to create a new card in the player's possession based on combining the distinct "½" card with at least one other numeric fractional value card from the third subset of cards; and iv) the fourth subset of cards includes: a plurality of distinct cards including a range of geometric shapes, mathematical symbols, special characters, or lines, assigned to and displayed on corresponding cards in the fourth subset of cards, the geometric shapes, mathematical symbols, special characters, or lines displayed on the cards of the fourth subset of cards forming a plurality of sets of matching cards;

(b) designating a winning word and a number of matching cards for a player to win the card game;

(c) designating a player to initiate the game;

(d) dealing a plurality of cards of a preset number from the distinct set of cards to each player to form an initial hand;

(e) forming a withdrawing deck from the remaining cards of the distinct set of cards after the preset number of cards has been dealt to each player;

(f) requiring a decision of a designated player to determine whether to discard one or more unwanted cards in the designated player's hand into a discard deck at a turn of the designated player and, when it is determined to discard the one or more unwanted cards, executing the decision of the designated player and discarding the one or more unwanted cards and withdrawing a number of cards from the withdrawing deck corresponding to the number of discarded cards and assigning the withdrawn number of cards to the designated player;

(g) determining whether the designated player's hand has the designated winning word from one or more cards from the first subset of cards in the designated player's hand or has the designated number of matching cards from one or more cards from the fourth subset of cards in the designated player's hand and, when included in the designated player's hand, including in the determining of the designated winning word or the designated number of matching cards one or more operations of one or more cards other than the first and fourth subset of cards in the designated player's hand, and determining based thereon whether the designated player has the designated winning word or the designated number of matching cards, and, when it is determined the designated player has the designated winning word or the designated number of matching cards, determining whether a winning combination of cards is in the designated player's hand;

(h) when it is determined the designated player's hand does not include the designated winning word, the designated number of matching cards, or does not include the winning combination of cards, requiring a decision by the designated player to play a card from other than the first or fourth subsets of cards when present in the designated player's hand, wherein the card designates an operation to be performed during the card game;

(i) moving the rotation to a next player as the designated player after a previous designated player has determined the previous designated player's hand does not include the designated winning word, the designated number of matching cards, or does not include the winning combination of cards;

(j) converting the discard deck of cards into the withdrawing deck when no card remains in the withdrawing deck; and (k) executing steps (f) through (j) until the cards in the hand of a current designated player have the designated winning word or the designated number of matching cards, and have the winning combination of cards in the current designated player's hand.

* * * * *